United States Patent Office 3,269,850
Patented August 30, 1966

3,269,850
ALUMINA REFRACTORIES
Eldon D. Miller, Jr., Bridgeville, Pa., assignor to Harbison-Walker Refractories Company, Pittsburgh, Pa., a corporation of Pennsylvania
No Drawing. Filed Mar. 17, 1965, Ser. No. 440,619
5 Claims. (Cl. 106—65)

The present invention relates to refractories of high alumina content by which is meant, for the purposes of this invention, refractories containing at least about 50% of $Al_2O_3$, by analysis. This invention relates to improvements in my United States Patent No. 3,067,050, issued December 4, 1962, for "Alumina Refractories."

In my patent, above identified, it is explained that high alumina refractories generally are classified according to their $Al_2O_3$ content into groups having, approximately, 50, 60, 70, 80, 90, and 99% $Al_2O_3$ by oxide analysis. Those containing 50 to 90% of $Al_2O_3$ are made by blending various high alumina refractory materials, while those of 99% content are made from high purity alumina. The more common high alumina refractory materials and their typical $Al_2O_3$ contents are discussed and set forth in detail in my patent. All of these materials are chemically compatible and, accordingly, they are commonly blended to provide almost any desired resulting $Al_2O_3$ content. The patent also describes various conventional manufacturing procedures.

The shapes of my invention disclosed in Patent No. 3,067,050, have proven themselves to be without peer in many service environments. However, there has remained the need for lower heat capacity which is required in certain process environments, for example, in certain electrically heated vacuum furnaces. Brick of my prior invention have such high heat capacity that they proved unsatisfactory in such an environment.

Accordingly, it is among the objects of this invention to provide high alumina refractories having many of the desirable properties of those previously available, as for example made according to the invention of my patent 3,067,050, including low permeability but which have much lower density and heat capacity.

Other objects of the invention will become apparent hereinafter.

The present invention is predicated upon the discovery that fired high alumina refractory bodies having densities typical of insulating refractories, and yet having high temperature strength and wear resistance similar to much denser bodies, may be prepared from batches containing volatilized silica and coarse and finely ground alumina refractory material, having a mullite binding matrix, in which the coarse ground alumina material is in the form of hollow, shot-like spheres.

After firing, the silica in the bodies is substantially all in the form of a fine crystalline mullite matrix reaction product. The mullite appears as a mass of sub-micron size crystals defining and enclosing large and isolated voids. Most of the voids are spherical. The refractory bodies are characterized by excellent hot load strengths, resistance to penetration and attack by molten metals (low permeability), and refractoriness comparable to bodies made according to my aforementioned patent. Quite surprising, these desirable properties are attained in bodies with a bulk density of only about 125 pcf, and less, as compared to 190 pcf, and more, for my previously mentioned refractories. The reason for the retention of such properties as strength while at the same time drastically decreasing density, is not fully understood. It may be that the spherical character of the multitude of disconnected voids through the brick is the reason since they do not disrupt the continuity of the bonding matrix. Also, the generally spherical shape of the voids would seem to more uniformly distribute stresses through the brick.

Thus, bodies are produced having a heat capacity approximately 40% lower than my prior high alumina refractories without affecting the other desired high temperature properties. This finding is totally unexpected, since prior refractories having a skeletal structure and relatively low density have been very friable and been known as insulating refractories. They are not intended for contact with molten material since they are so susceptible to penetration. My novel refractory bodies do have resistance to penetration since the voids are encapsulated i.e. disconnected. They may be employed as liners in vacuum ferro-chrome furnaces, in high temperature furnace and kiln crowns, rotary kiln hot zones and many other high temperature load bearing applications.

Fired high alumina refractory bodies, according to one embodiment of the present invention, are prepared from size graded refractory batches consisting of, (1) about 15 to 30% of −4 +65 mesh alumina in the form of hollow spheres, the major (at least 50%) part of the beads being −4 +10 mesh; (2) 1 to 10% volatilized silica; (3) 3 to 30% −325 mesh calcined alumina; (4) 0 to 10% −65 to −200 mesh crystalline silica, such as potters flint; (5) and the remainder, −65 mesh tabular alumina.

Batches are prepared by mixing and blending the above materials in the desired proportions, to provide a mix analyzing, by weight on an oxide basis, between about 50 and about 99% $Al_2O_3$. It is preferred that the calcined alumina be present in a weight quantity which is from about 2 to 4 times the weight quantity of volatilized silica in the batch, in order to facilitate the formation of mullite at high temperatures without the presence of more than a minimal amount of free silica. Actually, after firing, the free silica, if any, will be in the heat-altered form, cristobalite. The exact screen sizing to be used is dependent upon such factors as the raw materials used, and the purpose to which the refractory is to be put, but this is a matter well within the knowledge and skill of those familiar with the refractory field. There may be added to the batch a temporary binder or tempering agent, of which a wide variety are known and used in the manufacture of refractory brick. For example, the batch is tempered with water and dextrine and then pressed into self-sustaining bodies following which the shapes are dried and then fired. A preferred screen sizing for a batch is as follows:

| Screens | Percent | Ingredients |
|---|---|---|
| −3 +10 mesh | 10 | (Substantially all alumina spheres). |
| −10 +28 mesh | 15 | (Substantially all alumina spheres, some tabular alumina). |
| −28 +65 mesh | 5 | (Alumina spheres, some crystalline silica if such is present and some tabular alumina). |
| −65 mesh | 70 | (Calcined and/or tabular alumina, volatilized silica, crystalline silica, if present). |

Volatilized silica, as herein discussed, is silica which has been deposited from a vapor phase and which is substantially all finer than 50 microns, and more than 50%, by weight, finer than 10 microns. Such a silica analyzes at least about 90% $SiO_2$, and normally runs about 95% or more $SiO_2$. The remainder is comprised of FeO, MgO, and $Al_2O_3$, and it has about a 2% ignition loss.

The crystalline silica (i.e. such as potters flint) is generally −65 to −200 mesh particle size; usually it is 100% −200 mesh. As was true of compositions disclosed in my Patent 3,067,050, the crystalline silica addition is used to adjust the total Al₂O₃ content of the mixture if desired.

The spherical particles of alumina herein discussed are extremely pure, 99+% Al$_2$O$_3$ material. It is produced by heating a high purity alumina material above its melting point. While it is still molten, the alumina charge is poured through a blast of high velocity air, to produce small, bubble like, hollow spheres.

To more clearly point out the unexpected properties obtained by the substitution of spherical particles of alumina for the coarser alumina employed in my previous high alumina mixes, a plurality of batches were prepared as shown in the table below, formed into brick, tested, and compared with a high alumina brick made according to my Patent 3,607,050.

TABLE

| | U.S. Patent 3,067,050 | A | B |
|---|---|---|---|
| Mix: | | | |
| Spherical Alumina Particles, Percent | | 28 | 20 |
| Calcined Alumina, Percent | 15 | 27 | 30 |
| Volatilized Silica, Percent | 5 | 9 | 10 |
| Crystalline Silica, Percent | 5 | 9 | 10 |
| Tabular Alumina, Percent | 75 | 27 | 30 |
| Binder, Percent | 1 | 2 | 2 |
| Water, Percent | 1 | 3.3 | 4 |
| Burn, Cone | | 32 | |
| Bulk Density, pcf | 181 | 117 | 122 |
| Apparent Porosity, Percent | 17.5 | 42.3 | 40.1 |
| Percent Loss in Panel Spalling Test, Preheat at 3,000° F., Percent | | 0.0 | |
| Load Test, 25 p.s.i. Linear Subsidence, 3,000° F. | | 0.0 | |
| Linear Subsidence, 3,200° F. | 2.8 | | |
| Permeability, 2 p.s.i., cu. in./sec./sq. in. of area/in. thickness/p.s.i. | 0.11 | 0.38 | 0.28 |
| Heat Capacity, B.t.u. | 7,210 | 4,680 (Average) | |

In forming, it is essential the spherical particles not be broken down. Therefore, while brick of Patent 3,067,050 (as reported in the table) were formed at 4000 p.s.i. mix A was formed at only 2000 p.s.i. and mix B at only 1200 p.s.i.

The above table shows that the substitution of spherical alumina particles in amounts up to about 30% for a portion of the tabular alumina in mixes containing in addition calcined alumina and volatilized silica, provides refractory brick, in which the bulk density is much lower and the apparent porosity is much higher than brick formed by following the teachings of my designated patent. A most remarkable and surprising result is that the alumina brick of this invention have a panel spalling loss of zero, comparable to my previous brick, have a slightly greater hot load strength as is indicated by the linear subsidence data and only a slightly higher permeability. The brick of this invention also have a heat capacity which is approximately 38% lower than my previous brick.

Accordingly, the novel brick mixes set forth herein combine the insulating characteristics heretofore only associated with insulating brick and the high temperature load characteristics associated with high alumina brick to provide a refractory product useful in applications demanding some characteristics of both types of aforementioned brick which neither type could satisfy alone.

A preferred method and the best mode now known to me for the practice of my invention is as follows: A batch is prepared of the spherical particles of alumina discussed above, calcined alumina and volatilized silica. The spherical particles of alumina constitute 70% of the volume of the mix. After burning, this 70% is voids. They constitute substantially the entire −4 +65 mesh fraction of the brickmaking batch. In such a batch, there are two fractions; namely, the −4 +65 mesh one and the fines or −65 mesh fraction. The finer fraction has about 15–20% retained on a 325 mesh screen. Of course, all of the volatilized silica passes the 325 mesh screen and is, in fact, considerably finer than that which is discussed above. Calcined alumina of high purity such as Bayer process alumina, constitutes the remainder of the −65 mesh fraction. By weight, there is about 10 parts of the volatilized silica, about 10 parts potters flint, about 30 parts of the spherical alumina, and about 50 parts of the high purity calcined alumina. The batch is tempered with about 2 parts of dextrine and about 5 parts of water.

The batch is formed into shapes on a conventional mechanical press at about 1200 p.s.i. The shapes are burned at about cone 32, which is roughly about 3000° F.

As noted, the spherical particles of alumina preferably constitute substantially all of the coarser or −4 +65 mesh fraction of the batch. This fraction may constitute from about 15 to about 30%, by weight, of workable batches. The remainder, of course, passes the 65 mesh screen and from 15 to 20% of the finer fraction is retained on a 325 mesh screen.

In the foregoing discussion, all parts and percentages are by weight, and all chemical analyses are given on the basis of an oxide analysis in conformity with the common practice of reporting the chemical analysis of refractory materials. All screen sizes are according to the Tyler series.

It is intended that the foregoing description be construed as illustrative and not in limitation of the invention.

Having thus described my invention in detail and with sufficient particularity as to enable those skilled in the art to practice it, what I desire to have protected by Letters Patent is set forth in the following claims.

I claim:

1. A fired, high alumina refractory body made from a batch consisting essentially of, by weight, from 1 to 10% of volatilized silica, from 0 to 10% of crystalline silica, the remainder being high alumina refractory material which analyses at least about 50%, by weight, Al$_2$O$_3$ on an oxide basis, said high alumina refractory material including hollow spherical particles of alumina, said spherical particles of alumina constituting from 15 to 30%, by weight, of the batch and substantially all being −4 +65 mesh, there being a −65 mesh fraction including the volatilized silica, the crystalline silica, and the remaining high alumina material, said fired shape being characterized by a substantially continuous skeletal network of fine crystalline mullite encapsulating separate and discontinuous spherical voids, said voids in number and size being substantially identical to the spherical particles of alumina, in the batch from which the body is made.

2. The body of claim 1 in which the voids constitute about 70% of the volume of the body.

3. A high alumina refractory body batch consisting essentially of, by weight, from 1 to 10% of volatilized silica, from 0 to 10% of crystalline silica, the remainder being high alumina refractory material which analyses at least about 50%, by weight, Al$_2$O$_3$ on an oxide basis, said high alumina refractory material including hollow spherical particles of alumina, said spherical particles of alumina constituting from 15 to 30%, by weight, of the batch and substantially all being −4 +65 mesh, there being a −65 mesh fraction including the volatilized silica, the crystalline silica, and the remaining high alumina material.

4. A fired, high alumina, refractory body prepared from a size graded, high alumina, refractory mix having the following composition (all percentages by weight):

| | Percent |
|---|---|
| Hollow, spherical particles of alumina (−4 +65 mesh) | 15–30 |
| Volatilized silica | 1–10 |
| Crystalline silica | 0–10 |
| Calcined alumina (−325 mesh) | 3–30 |
| Tabular alumina (−65 mesh) | The remainder | said fired body being characterized by having a matrix consisting of a fine crystalline mullite network in the form of a mass of submicron-size crystals, said network encapsulating large and disconnected voids whereby a body having relatively high hot load strength and low permeability and heat capacity is obtained.

5. The body of claim 4 in which the crystalline silica is potter's flint.

References Cited by the Examiner

UNITED STATES PATENTS 2,965,506  12/1960  Ueltz _____ 106—65
3,067,050  12/1962  Miller _____ 106—65

TOBIAS E. LEVOW, *Primary Examiner.*

J. E. POER, *Assistant Examiner.*